May 5, 1931.  W. W. STEVENSON  1,804,036
FLUID FLOW METER
Filed March 20, 1928  5 Sheets-Sheet 1
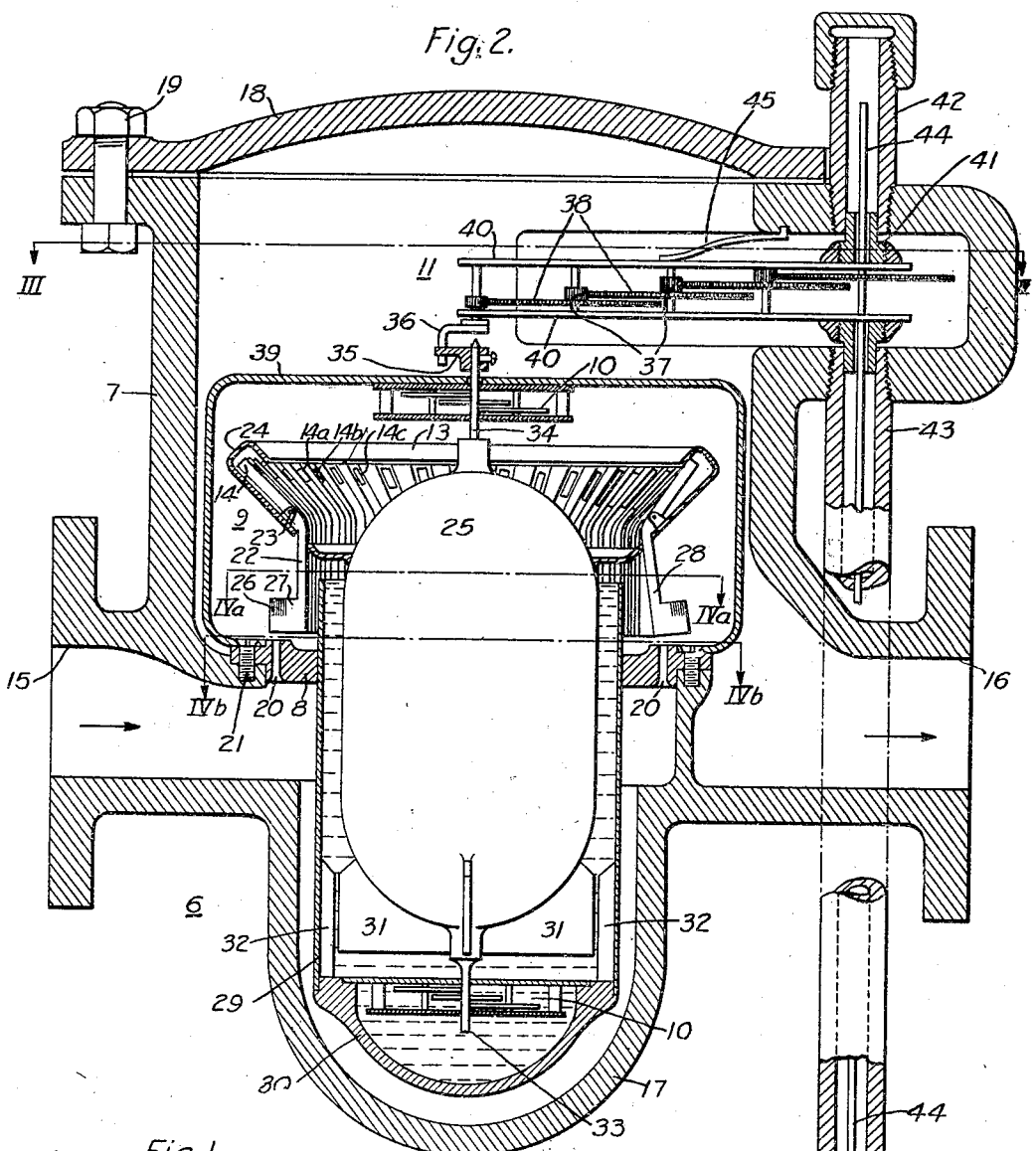
Fig. 2.
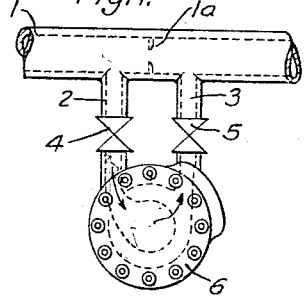
Fig. 1.
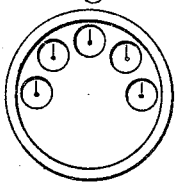
Fig. 2a
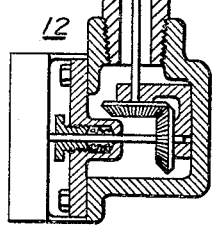
INVENTOR
Wilbur W. Stevenson
BY
William R. Coley
ATTORNEY

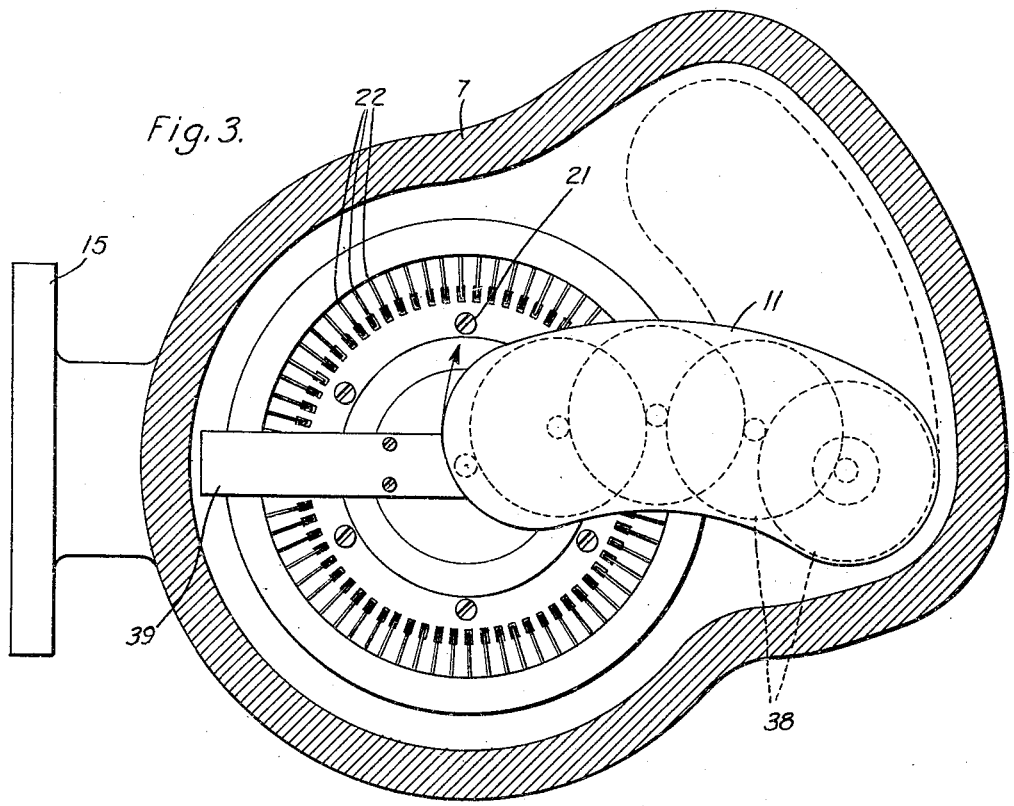
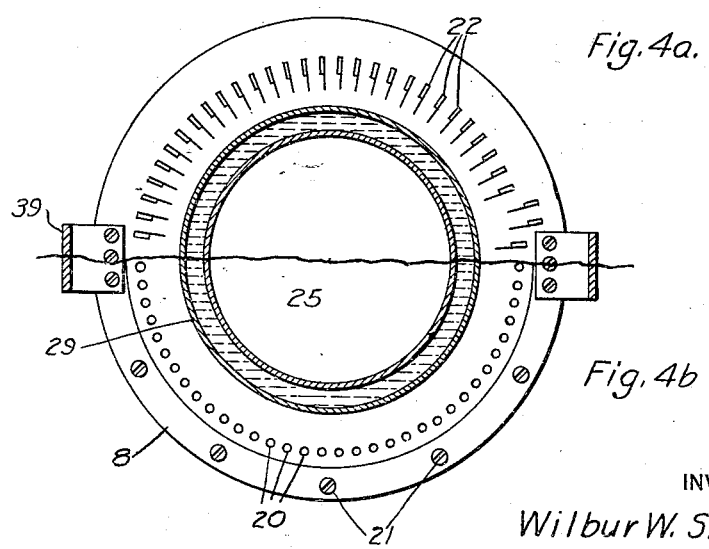

May 5, 1931.  W. W. STEVENSON  1,804,036
FLUID FLOW METER
Filed March 20, 1928  5 Sheets-Sheet 3
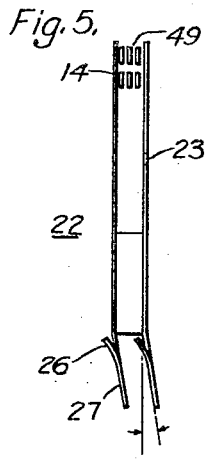
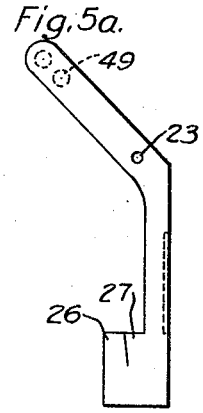
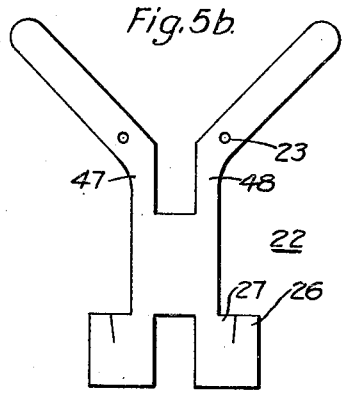
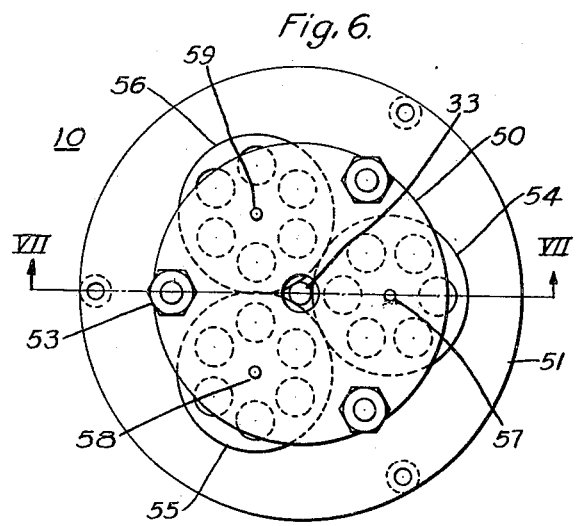
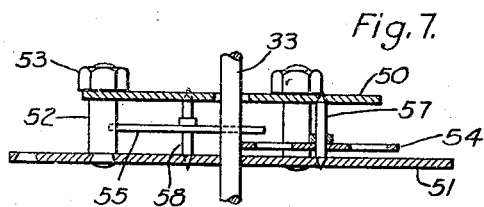
INVENTOR
*Wilbur W. Stevenson*
BY
*William R. Coley*
ATTORNEY May 5, 1931.  W. W. STEVENSON  1,804,036
FLUID FLOW METER
Filed March 20, 1928    5 Sheets-Sheet 4
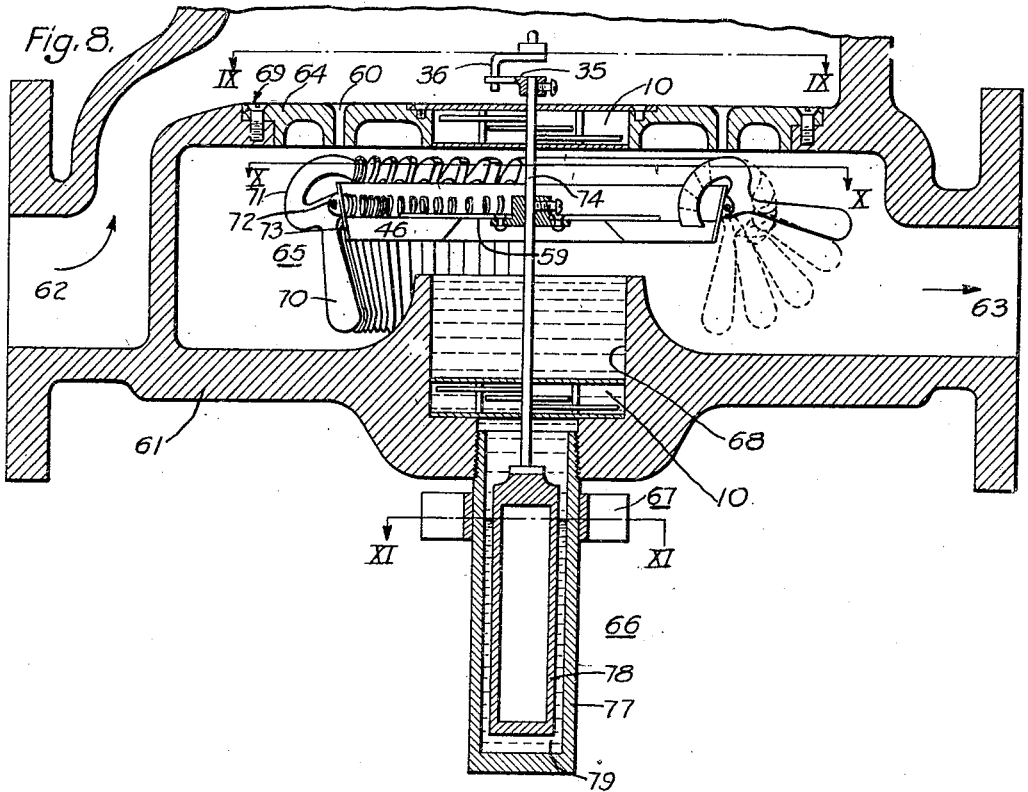
Fig. 8.
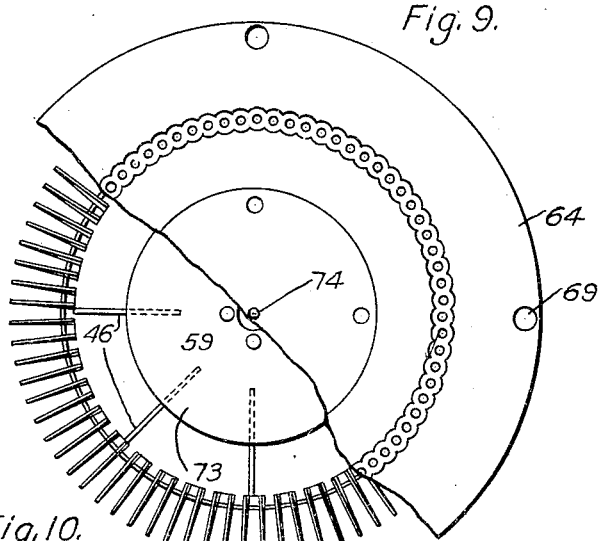
Fig. 9.
Fig. 10.
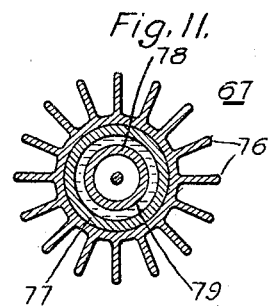
Fig. 11.
INVENTOR
Wilbur W. Stevenson
BY
William R. Coley
ATTORNEY May 5, 1931.  W. W. STEVENSON  1,804,036
FLUID FLOW METER
Filed March 20, 1928  5 Sheets-Sheet 5
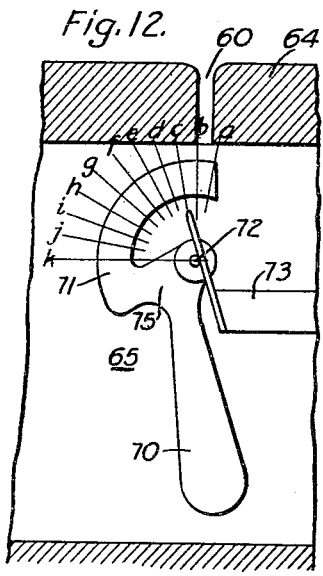
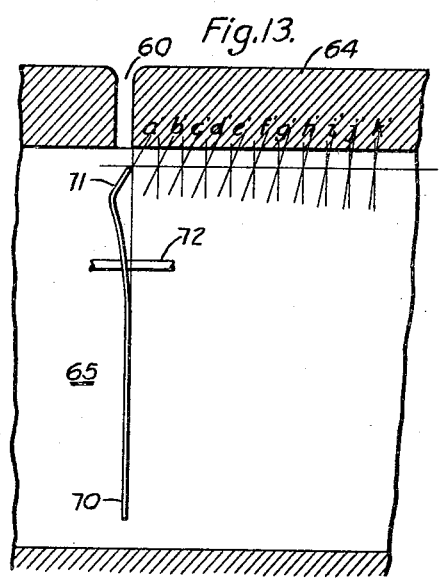
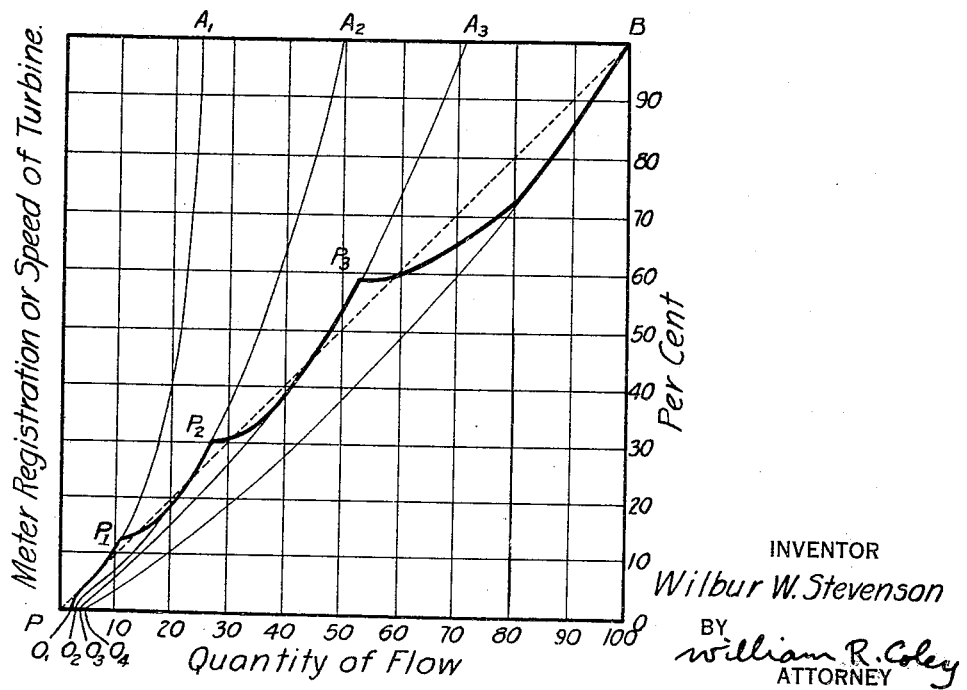
INVENTOR
Wilbur W. Stevenson
BY William R. Coley
ATTORNEY Patented May 5, 1931

1,804,036

UNITED STATES PATENT OFFICE

WILBUR W. STEVENSON, OF PITTSBURGH, PENNSYLVANIA

FLUID FLOW METER

Application filed March 20, 1928. Serial No. 263,052.

My invention relates to fluid flow meters, particularly devices of this character that are especially adapted for measuring steam flow.

One object of my invention is to provide a fluid flow meter having a rotatable turbine wheel or the like with blades mounted to automatically (that is, responsive to the action of centrifugal force) change the portion of their surfaces exposed to an impinging fluid in such manner as to cause the speed of the turbine to be substantially proportional to the volume of fluid flow causing rotation of the wheel.

The second object of my invention is to provide a device of this character in which the turbine blades embody portions disposed at different angles, these portions being thus automatically and selectively disposed in the path of an impinging fluid to provide a registration on the meter that is substantially in accord with the actual volume of fluid flow through the meter.

Another object of my invention is to provide a rotatable turbine wheel having a plurality of movably mounted blades adapted to automatically and selectively change their positions at different speeds under the action of centrifugal force to produce substantially accurate meter readings.

Another object of my invention is to provide a turbine blade that is movably mounted in operative position and is adapted to shift its position, during operation of the turbine, under the influence of centrifugal force.

A further object of my invention is to provide a blade of this character mounted to automatically change, under the action of centrifugal force, the portion of its surface located opposite a steam nozzle.

Another object of my invention is to provide a turbine blade responsive to centrifugal force, but operable only between predetermined limits.

A further object of my invention is to provide a transmission mechanism or gear train adapted to be readily moved or swung into and out of operative engagement with the driven member of a meter or the like.

Still another object of my invention is to provide, in a device of the above-described character, a tank supported by a stationary nozzle ring, together with a turbine rotor adapted to be operatively supported by fluid in the tank in such manner as to properly cooperate with the steam nozzle-ring.

A further object of my invention is to provide a turbine blade member having two substantially parallel sides, each terminating at one end in fluid-engaging portions disposed at different angles.

A still further object of my invention is to provide a bearing for a rotatable element, such as a turbine wheel, comprising a plurality of spaced roller or disc members positioned in different planes, one above the other, and adapted to suitably engage and support the rotatable element.

Another object of my invention is to provide a turbine blade having a fluid-engaging portion gradually changing in angular relation, whereby, in response to the action of centrifugal force, successive parts of said portion are exposed in the path of an impinging fluid.

A further object of my invention is to provide a fluid meter in conjunction with a main pipe having a restricted orifice, the inlet and outlet pipes disposed on opposite sides of the orifice being provided with valves or other means for effecting or closing communication between the main pipe and the meter.

My invention may best be understood by reference to the accompanying drawings, wherein Figure 1 is a semi-diagrammatic view of a meter constructed according to my invention associated with a main steam pipe or the like having a restricted orifice, Fig. 2 is a view in vertical, longitudinal section of a meter device constructed in accordance with the preferred embodiment of my invention, Fig. 2a is a view in end elevation of the registration device that is associated with my fluid flow meter, Fig. 3, Fig. 4a and Fig. 4b are transverse sectional views taken along the lines III—III, IVa—IVa, and IVb—IVb, respectively, of Fig. 2, Fig. 5 is a detailed view of a duplex turbine blade constructed in accordance with my present invention, Fig. 5a being a view in side elevation of the turbine blade, and Fig. 5b being a view of the blank from which the completed turbine blade is formed, Fig. 6 is a view in end elevation, and Fig. 7 is a view in section, taken along the line VII—VII of Fig. 6, of a special roller bearing that is employed in my fluid flow meter, Fig. 8 is a fragmentary view in longitudinal section of a modification of the turbine-wheel portion of my meter, Fig. 9, Fig. 10 and Fig. 11 are transverse sectional views, taken along the lines IX—IX, X—X and XI—XI, respectively, of Fig. 8, Fig. 12 and Fig. 13 are semi-diagrammatic views, serving to illustrate the contour of each of the turbine blades shown in Fig. 8, and Fig. 14 is a curve chart serving to illustrate the principle of operation of my present invention.

Referring first to Fig. 14, the ordinates therein represent the meter registration or speed of the turbine-wheel, while the abscissæ represent quantity or volume of flow.

The ideal curve for a fluid flow meter would be, of course, the straight line PB, which would represent an absolute proportionalty between the meter registration and the quantity of flow. However, in such prior meters of this character of which I am aware, the speed of the turbine-wheel at low registration has been materially below the speed corresponding to the actual quantity of fluid flow.

The various lines $O_1A_1$, $O_2A_2$, etc., represent curves that would be obtained from meters having their turbine blades disposed or fixed at correspondingly different angles, the curve $O_1A_1$ corresponding to the greatest angle. In other words, by varying the angle of that portion of the turbine blade that is exposed to the steam or other impinging fluid, the speed of rotation of the turbine-wheel, and, therefore, the registration of the meter may be correspondingly varied.

My invention, therefore, embodies this principle in a practical form by providing each turbine blade with two or more different faces or surfaces disposed at suitable angles, whereby, responsive to centrifugal force as the turbine wheel increases or decreases its speed, the proper face or surface of the turbine blade is disposed in the path of the impinging fluid.

Furthermore, different groups of the blades are counter-weighted differently, so that the respective groups act successively under the influence of centrifugal force. For example, in Fig. 14, the points $P_1$, $P_2$ and $P_3$ represent automatic shifting of certain groups of blades under the action of centrifugal force at different speeds. In this case, the actual registration curve of the meter, changing as it does from curve $O_1A_1$ to $O_2A_2$, etc., is represented by the composite curve $O_1P_1P_2P_3B$.

Consequently, if a relatively large number (such as eleven) of differently-weighted groups of blades or fluid-engaging surfaces in each turbine blade were provided to swing into the proper position under the action of centrifugal force corresponding to certain speeds, the registration curve of such a meter would be approximately as shown by the straight line PB.

Thus, by providing only two different angular surfaces on each turbine blade and selecting them of suitable angles and providing the proper weight relations in a number of groups of blades, the automatic action of centrifugal force is so utilized as to provide a registration curve that is sufficiently close to the ideal curve PB as to be commercially satisfactory and, of course, that represents a very material improvement in accuracy over the registration of fluid flow meters now on the market of which I am aware.

Referring now to Fig. 1 of the drawing, the apparatus there shown comprises a main steam pipe or conduit 1 having a suitable restricted opening or orifice 1a, on opposite sides of which inlet and outlet pipes 2 and 3, respectively, are provided for by-passing a flow of steam around the orifice through my fluid flow meter 6. Suitable valves or other devices 4 and 5 are provided in the inlet pipe 2 and the outlet pipe 3, respectively, for the purpose of permitting communication between the main pipe 1 and the fluid flow meter 6 to be either effected or closed, as desired.

The preferred construction of my meter 6 is shown in Fig. 2 as comprising an outer casing or shell 7 for housing a stationary nozzle-ring 8, and a turbine wheel or rotor 9 that is supported in a pair of bearings 10 for actuating a transmission mechanism or gear train 11 that drives a registration or indication device 12.

The casing 7 may be of any suitable shape and is provided with an inlet opening 15 and an outlet opening 16 corresponding to the pipes 2 and 3 of Fig. 1. For the sake of simplicity, the inlet and the outlet 15 and 16, respectively, are not shown as occupying exactly the same positions as those indicated in Fig. 1. However, it will be understood that this particular point is not material with respect to my present invention.

Between the inlet and outlet openings 15 and 16, respectively, a bulb or depressed part 17 is provided in the casing 7 for the purpose of suitably housing the lower portion of the turbine rotor 9, as hereinafter more fully described. A suitable cap or cover member 18, that is held in position by bolts, or the like, 19, is provided for suitably completing the enclosure of the meter parts.

The nozzle-ring 8 is shown in plan view in Fig. 4b as comprising a plurality of circumferentially arranged openings or nozzles 20 for permitting the flow of incoming fluid, such as steam, to be directed against the turbine-wheel blades. The ring 8 may be secured in position in any suitable manner, as by means of short screws 21 that are threaded into suitable projections of the casing 7.

The turbine rotor 9 comprises a plurality of blades 22, shown in detail in Fig. 5, that are pivotally mounted at an intermediate point 23 upon an annular member or ring 24, the lower and inner edge of which is suitably secured to a float member 25 near the upper end thereof. The upper and outer edge of the ring 24 is provided with a short flange 13, whereby the movement of the outer weighted end 14 of each turbine blade 22 is restrained or limited for a purpose to be described. It will be understood that any other suitable stop means for limiting the movement of the blades 22, under the action of centrifugal force, around the pivotal point 23, may be utilized, if desired.

It will be noted that weights 14a, 14b, etc., of different values are progressively disposed on the turbine blades, whereby different groups (preferably about eleven) of blades (including blades on opposite sides or at equally spaced points to maintain dynamic balance of the turbine rotor), successively shift or fly out under the action of centrifugal force at different speeds.

The lower end of each turbine blade 22 embodies an outer portion 26 having a certain angular relation or tilt and an inner portion 27 having a lesser angle. Normally, the outer or large-angle portions 26 of the several blades are located, as determined by the normal free-hanging position of the blades, opposite the nozzle openings 20, so that steam from the nozzles impinges upon the blade portions 26 around the periphery of the turbine wheel. However, when the speed increases above a predetermined value, the inner smaller-angle portions 27 of a certain group of blades (having given counterweights) are disposed opposite the nozzles 20, as indicated on the right-hand side of the turbine wheel by the reference character 28. At a slightly higher speed, another group (having another size of counterweights) shifts; and this process is repeated until at full rotor speed, all of the blades have shifted to their outermost positions. Consequently, the speed of the turbine rotor for a given quantity flow of steam is proportionally greater under low-speed conditions than under high-speed conditions, the result being that the actual turbine speed and, therefore, the meter registration is very closely proportional to the actual fluid flow through the meter.

To reduce the effective weight and friction of the turbine rotor 9, the above-mentioned float member 25 is provided to support the turbine blades, the float being located in a tank or vessel filled with water or other suitable fluid and comprising a cylindrical shell 29 and a bottom closure or cap 30. The cap 30 and the lower portion of shell 29 are housed in the bulb part 17 of the meter casing 7. The shell 29 and the cap 30 are secured to and supported by the inner edge of nozzle-ring 8. The lower spindle 33 of the float is supported in one of the bearings 10, which, in turn, is mounted upon the cap or closure 30. The other or upper spindle 34 of the float 25 is mounted in another bearing 10, which is secured to a yoke member 39 that is suitably mounted upon the outer edge of nozzle-ring 8 by means of certain of the screws 21, or otherwise. The detailed construction of the bearings 10 is shown in Figs. 6 and 7 and will be described later.

A plurality of suitable vanes or fins 31 are secured to the lower rounded surface of the float member 25 and a suitable number of corresponding vanes or fins 32 are secured to the inner side of the cylindrical shell member 29. The liquid friction caused by the rotation of vanes 31 past vanes 32 is large compared with the liquid friction on the surface of the float or that caused by any sediment or impurities which might adhere to that surface. Consequently, a proper steadying and restraining force is provided for the turbine-wheel, which, at the same time, by reason of being supported in the illustrated tank of fluid, and with which is associated the upper and lower roller bearings 10, the operating friction is reduced to a minimum.

The liquid for supporting the float member may, as stated above, be water or any liquid having a specific gravity heavier than the fluid being measured. This floating liquid may be replenished from time to time, as it may evaporate or otherwise disappear, from a supply of similar liquid entrained in or derived from the fluid being measured. The angular space between the vessel or tank 29 and the meter casing portion 17 may or may not be filled with a liquid, as desired.

The upper end of the float spindle 34 is provided with a horizontally-extending projection or arm 35 which is adapted to loosely engage or contact with a vertically depending operating arm 36 of the gear train 11. This gear train need not be described in detail, as it may be of any well-known form comprising, essentially, a plurality of suitable pinions 37 and gears 38 so associated and mounted between upper and lower plates 40 as to constitute a unitary member that is secured to a pivot or bearing 41, which is suitably mounted in adjacent portions of the meter casing 7. In this way, the gear train 11 may be bodily or as a unit swung out of operative position into the dotted-line position shown in Fig. 3, whereby the entire rotor member from the arm 35 to the lower cap 30 may be removed as a unit through the open top of the meter casing by merely removing the several short screws 21.

The gear train 11 may be held in its normal operative position by means of a suitable spring clip 45 or the like that engages an adjacent portion of the meter casing 7.

A short upper pipe 42 and a longer lower pipe 43, threaded into walls of the meter casing 7, serve to directly support the outer portions of the pivot or bearing 41 and likewise house a suitable spindle 44, the lower end of which is provided with suitable bevel gears or the like that constitute the operating mechanism of the registration device or integrator 12, the face of which is indicated by Fig. 2a.

Each turbine blade 22 is formed in the manner indicated in Fig. 5b, comprising two side members or arms 47 and 48, each of which terminates in a fluid-engaging portion having two faces 26 and 27 disposed at different angles for the purpose hereinbefore set forth.

These turbine blades are preferably formed two at a time by bending the arms 47 and 48 toward each other to produce the channel shaped duplex blade shown in Fig. 5. For the purpose of suitably counterweighting the different groups of turbine blades, in order that they may properly respond to the action of centrifugal force during operation, suitable numbers of small weights 49, or the like, may be secured to the upper ends of the blade, preferably between them.

Figs. 6 and 7 show in detail the roller bearing 10, which comprises two outer supporting members or plates 50 and 51 that are spaced apart and secured together by suitable bolts or the like 52, which may be provided with nuts 53 for rigidly fastening the plates together. Between these plates, three roller or disc members, of relatively large diameter, 54, 55 and 56 are disposed with their pivots 57, 58 and 59 spaced substantially 120° apart. The pointed ends of these pivots fit into recesses or openings in the plates 50 and 51, as will be understood, to provide relatively low friction bearings for the roller members.

The discs 54, 55 and 56 are of substantially the same size and, when thus equally spaced, engage points on the float spindle, such as 33, substantially 120° apart. The spindle thus has a three-point bearing or journal support, although the respective points of contact are located in superposed planes. In this way, a roller bearing device is provided for suitably supporting the turbine rotor with a minimum of rotating friction.

Fig. 8 discloses a modification of the turbine rotor shown in Fig. 2. The illustrated portion of the fluid flow meter comprises a suitable casing member 61 having appropriate inlet and outlet openings or passages 62 and 63, respectively, and a nozzle-ring 64 which is secured by small screws 69, for example, to suitable internal projections of walls of the meter casing, the nozzle-ring 64 thus forming a top closure for the turbine chamber, which houses a novel type of turbine-wheel 65. The turbine-wheel is supported by a mercury flotation device 66, which is provided with a heat-radiating member 67. A lower bearing 10 for the spindle 74 of the turbine wheel is disposed in a recess 68 in the bottom wall of the meter casing, while a similar upper bearing is positioned in the nozzle-ring 64, which is provided with a suitable number of nozzles or openings 60.

Each turbine blade 65 comprises a sheet metal member or the like having a lower weighted portion or pendant 70 that is adapted to move outwardly under the action of centrifugal force, as indicated by the various dotted outlines at the right-hand side of the turbine-wheel. Each blade is further provided with a fluid-engaging portion 71 having the general contour of a crescent, but the broad face of which has a gradually changing angular relation from its free to its other end, as about to be described in detail. Each blade is pivoted at an intermediate point 72 upon a disc or hub 73, preferably of sheet metal, which is suitably secured through arms 46 and disc 59 to the central spindle 74.

Referring particularly to Figs. 12 and 13, which illustrate the detailed construction of the turbine blade 65, the crescent portion 71 in Fig. 12 is intersected by eleven lead lines marked $a$ to $k$, inclusive. The angle of the fluid-engaging portion 71 at each of these lines of intersection is indicated in Fig. 13 by the various lines marked $a'$ to $k'$, inclusive. It will thus be seen that the angle of the portion 71 gradually decreases from its tip to the point where it joins the body portion 75 of the blade, at which point the crescent-shaped portion has a surface approximately parallel to the lower or pendant portion 70 of the blade.

In this way, as the turbine-wheel increases in speed, steam from the nozzles 60, which initially impinges upon the portion indicated by $a$, successively strikes the portions indicated by $b$ to $k$, inclusive. This action takes place automatically by reason of the pendant 70 swinging outwardly, as indicated in Fig. 8, under the influence of centrifugal force. A blade of this character would provide a registration curve corresponding very closely to the straight line PB of Fig. 14, by reason of the fact that the turbine-wheel operates at a proportionately greater speed for small qauntities of flow than it does for large quantities, and this disproportion is gradually decreased as the turbine blade swings outwardly under the action of centrifugal force.

It should be noted that, in the structure of Fig. 8, all the blades have the same weight of pendant 70, while the fluid-engaging portion 71 has eleven different angles; on the other hand, in the structure of Fig. 2, there are several groups (preferably about eleven) having progressively increasing counterweights, while the fluid-engaging portion of each blade has only two angles. However, the resultant or final effect, as regards accuracy of registration, is the same in either case. Moreover, it will be understood that, if desired, a combination of these two schemes may be employed with satisfactory results.

The mercury flotation device 66 is shown as comprising a hollow plunger 78 that is disposed in a pool of mercury 79 contained in a suitable pipe or narrow-diameter tank 77, which extends below the meter casing 61 and is threaded into the lower wall thereof. It will be understood that this mercury flotation device may be employed in lieu of the water flotation device 25 that is shown in Fig. 2, if desired.

In order to remove any detrimental influence of heat from the mercury flotation device 66, the radiation member 67 is interposed between the body of mercury 79 and the meter casing 61 around the pipe or tank 77. This radiating device 67 comprises a plurality of fins or ribs 76 extending outwardly to a predetermined distance, thereby quickly radiating any heat that may be carried by convection or conduction to the upper portion of the tank 77.

It will thus be seen that I have provided a fluid flow meter which is capable of producing a registration curve very close to the ideal straight line relation between the speed of rotation of the turbine-wheel and the actual quantity of flow, the accuracy of the device being secured through the automatic selective action of the turbine blades, responsive to centrifugal force during operation of the meter. Furthermore, the device is compact, reliable, readily assembled and disassembled and provides various other operating advantages.

While I have shown certain embodiments of my invention, I do not wish to be restricted the specific structural details or arrangement of parts thereof, as various other modifications may be made without departing from the spirit and scope of my invention. I desire, therefore, that only such limitations shall be imposed as are indicated in the appended claims.

I claim as my invention:

1. In a fluid meter, a rotatable turbine wheel having weighted blades pivotally mounted to change, as a result of rotation of said wheel, the portion of their surfaces exposed to an impinging fluid of restricted cross-section in such manner as to cause the speed of the turbine to be substantially proportional to the volume of fluid flow causing rotation of said wheel.

2. In a fluid meter, a rotatable turbine wheel having weighted blades provided with portions disposed at different angles, said blades being so pivotally mounted as to automatically dispose, under the influence of rotation of said wheel, first one portion and then another in the path of an impinging fluid in such manner as to cause the speed of the turbine to be substantially proportional to the volume of fluid flow causing rotation of said wheel.

3. In a fluid meter, a rotatable turbine wheel having weighted blades provided with angularly related portions, said blades being so pivotally mounted as to be responsive to centrifugal force for transferring one portion of the blades or another into the path of an impinging fluid in such manner as to cause the speed of the turbine to be substantially proportional to the volume of fluid flow causing rotation of said wheel.

4. A weighted turbine blade having a plurality of angularly related portions and pivotally mounted to automatically transfer under the influence of revolution of said blade one portion or the other into the path of an impinging fluid.

5. A weighted and pivotally mounted turbine blade having a plurality of angularly related portions and responsive to the action of centrifugal force for transferring one portion or the other into the path of an impinging fluid.

6. In a fluid flow device, a stationary separable nozzle ring, a tank supported solely thereby and extending on both sides thereof, and a turbine rotor adapted to be operatively supported by fluid in said tank for cooperating with said nozzle ring.

7. A turbine blade member having two distinct elongated side members in substantially parallel planes, each terminating at one end in angularly related fluid-engaging portions.

8. In a fluid meter, a rotatable turbine wheel having a plurality of movably mounted blades of different weight characteristics adapted to selectively change their positions at different speeds under the action of centrifugal force.

9. In a turbine, a nozzle, and a weighted blade pivotally mounted to change as a result of its revolution the portion of its surface located opposite said nozzle.

10. In a turbine, a nozzle, and a weighted and pivotally mounted blade responsive to the action of centrifugal force for changing the angle of its surface relative to said nozzle.

11. In a turbine, a nozzle, and a weighted blade having a plurality of angularly related portions and pivotally mounted to automatically transfer, under the influence of revolution of said blade by centrifugal force, one portion or the other into operative alinement with said nozzle.

12. In a turbine, a nozzle, and a weighted blade having a plurality of portions disposed at different angles and pivotally mounted to be responsive to the action of centrifugal force for transferring one portion or the other into operative alinement with said nozzle.

13. A weighted and pivotally mounted turbine blade responsive to the action of centrifugal force for changing the portion of its surface exposed to an impinging fluid, and means for confining such change within predetermined limits.

14. In a turbine, a nozzle, a weighted blade pivotally mounted to change as a result of its revolution the portion of its surface located opposite said nozzle, and means for restricting such change within predetermined positions.

15. A weighted turbine blade having a plurality of angularly related portions pivotally mounted to automatically transfer under the influence of revolution of said blade one portion or the other into the path of an impinging fluid, and means for limiting the permissive degree of such transfer.

16. In a turbine, a nozzle, a weighted blade having a plurality of portions disposed at different angles and pivotally mounted to be responsive to the action of centrifugal force for transferring one portion or the other into operative alinement with said nozzle, and stop means for limiting the degree of such transfer.

17. In a fluid flow device, a stationary separable nozzle ring, a tank supported solely thereby and extending on both sides thereof, and having a bearing in the lower end thereof and a turbine rotor associated with said bearing and adapted to be operatively supported by fluid in said tank for co-operating with said nozzle ring.

18. In a fluid flow device, a stationary separable nozzle ring, a tank supported solely thereby and having a bearing in the lower end thereof, a second bearing alined with the first-named bearing and supported from said nozzle ring, and a turbine rotor associated with said bearings and adapted to be operatively supported by fluid in said tank for cooperating with said nozzle ring.

19. In a fluid flow device, a stationary nozzle ring, a tank supported thereby and having a bearing in the lower end thereof, a yoke secured to said nozzle ring, a second bearing mounted on said yoke and alined with the first-named bearing, and a turbine rotor associated with said bearings and adapted to be operatively supported by fluid in said tank for cooperating with said nozzle ring.

20. A turbine blade member having two elongated sides in substantially parallel planes, each terminating at one end in fluid-engaging portions disposed at different angles relative to said sides, and weights secured to said sides at the other ends thereof.

21. A turbine blade member formed from a flat piece of metal to have two distinct elongated side members in substantially parallel planes, each terminating at one end in fluid-engaging portions disposed at different angles relative to said side members.

22. A turbine blade member formed from a flat piece of metal to have two elongated sides in substantially parallel planes, each terminating at one end in fluid-engaging portions disposed at different angles relative to said sides, and weights secured to said sides at the other ends thereof.

In testimony whereof, I have hereunto subscribed my name this twelfth day of March, 1928.

WILBUR W. STEVENSON.